United States Patent
Moinard et al.

(10) Patent No.: US 10,322,743 B2
(45) Date of Patent: Jun. 18, 2019

(54) VEHICLE STEERING WHEEL

(71) Applicant: AUTOLIV DEVELOPMENT AB, Vargarda (SE)

(72) Inventors: Fabrice Moinard, Vouzailles (FR); Sébastien Cassin, Poitiers (FR); Pierre Basque, Marigny Brizay (FR); Pascal Bouhet, Vendeuvre du Poitou (FR); Guillaume Hesry, Le Bouscat (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 334 days.

(21) Appl. No.: 14/897,180

(22) PCT Filed: May 20, 2014

(86) PCT No.: PCT/EP2014/060275
§ 371 (c)(1),
(2) Date: Dec. 9, 2015

(87) PCT Pub. No.: WO2014/198499
PCT Pub. Date: Dec. 18, 2014

(65) Prior Publication Data
US 2016/0114826 A1    Apr. 28, 2016

(30) Foreign Application Priority Data
Jun. 14, 2013   (FR) ...................... 13 01386

(51) Int. Cl.
*B62D 1/11*   (2006.01)
*B62D 1/06*   (2006.01)
*B62D 1/04*   (2006.01)

(52) U.S. Cl.
CPC ............... *B62D 1/11* (2013.01); *B62D 1/046* (2013.01); *B62D 1/06* (2013.01)

(58) Field of Classification Search
CPC .................................. B62D 1/11; B62D 1/06
See application file for complete search history.

(56) References Cited

U.S. PATENT DOCUMENTS 2,943,164 A * 6/1960 Kniffin, Jr. ............. B60Q 5/003
200/61.57
3,823,618 A * 7/1974 Broyer ..................... B62D 1/04
74/552

(Continued)

FOREIGN PATENT DOCUMENTS

DE     102008036161 A1    2/2010
EP          0856432 A2 *   8/1998
(Continued)

OTHER PUBLICATIONS

What is polyurethane? http://polyurethanes.org/en/what-is-it, Dec. 3, 2017.*

(Continued)

*Primary Examiner* — Vinh Luong
(74) *Attorney, Agent, or Firm* — Stephen T. Olson; Harness, Dickey & Pierce, P.L.C.

(57) ABSTRACT

A vehicle steering wheel includes a rim having a cavity, and a device arranged in the cavity of the rim. The vehicle steering wheel further includes a hood designed to close the cavity and a polymer injected around the rim and around the hood. A seal is arranged to prevent the polymer from being introduced into the cavity during its injection.

6 Claims, 1 Drawing Sheet

(56) References Cited

U.S. PATENT DOCUMENTS

| | | | |
|---|---|---|---|
| 7,651,124 B2 | 1/2010 | Gulde | |
| 7,852,225 B2 | 12/2010 | Lemasson | |
| 8,087,691 B2 | 1/2012 | Nebel et al. | |
| 8,636,302 B2 | 1/2014 | Nebel et al. | |
| 8,875,597 B2 | 11/2014 | Groleau et al. | |
| 9,139,217 B2 | 9/2015 | Bertrand et al. | |
| 9,352,768 B2 | 5/2016 | Doursoux et al. | |
| 2001/0000937 A1* | 5/2001 | Winget | B29C 45/14 280/731 |
| 2005/0050981 A1* | 3/2005 | Warhover | B62D 1/06 74/552 |
| 2006/0230873 A1* | 10/2006 | Buiocchi | B22D 15/005 74/552 |
| 2007/0092355 A1* | 4/2007 | Burger | F16B 5/0233 411/535 |
| 2008/0018087 A1* | 1/2008 | Yamada | B29C 44/1271 280/775 |
| 2011/0153160 A1 | 6/2011 | Hesseling et al. | |
| 2016/0129860 A1 | 5/2016 | Moinard et al. | |
| 2018/0244298 A1* | 8/2018 | Matrat | B62D 1/06 |

FOREIGN PATENT DOCUMENTS

| | | | | |
|---|---|---|---|---|
| JP | 2002225725 A | * | 8/2002 | ............... B62D 1/06 |
| WO | WO-0184618 A2 | | 11/2001 | |
| WO | WO-2009030497 A2 | | 3/2009 | |

OTHER PUBLICATIONS

Define shore a hardness—Google Search, google.com., Dec. 4, 2017.*

Define self-furrowing screws—Google Search, google.com., Dec. 4, 2017.*

EPO Machine Translation including the claims of DE 102008036161, Frank et al., Apr. 2, 2010.*

EPO Machine Translation of JP 2002225725 (A) of Ochiai et al., Aug. 14, 2002. (Year: 2002).*

PTO Machine Translation of Notice of Opposition/Appeal against European Patent 3,007,956, Nov. 15, 2017. (Year: 2017).*

Notice of Opposition against European Patent 3,007,956, Nov. 15, 2017 (Year: 2017).*

International Search Report and Written Opinion of the ISA, ISA/EP, Rijswijk, NL, dated Sep. 14, 2014.

* cited by examiner

VEHICLE STEERING WHEEL

CROSS-REFERENCE TO RELATED APPLICATIONS

This application is a 371 U.S. National Stage of International Application No. PCT/EP2014/060275, filed May 20, 2014, which claims the benefit of and priority to French Patent Application No. 13/01386, filed Jun. 14, 2013. The disclosures of the above applications are incorporated herein by reference.

FIELD

The present invention relates in a general manner to a steering wheel for being mounted in an automobile.

Steering wheels equipped with a vibrating motor for obtaining a supplementary function for the user are known in the prior art. For example, document U.S. Pat. No. 7,852,225 describes a steering wheel with a motor that drives an unbalance for putting the steering wheel in vibration. On the other hand, this system has in particular the disadvantage of not being very effective because it is remote from the rim on which the user's hands are placed. Nevertheless, the rim is generally moulded over with a liquid polymer then hardens. This operation of moulding over poses problems of quality because the motor can be blocked by the polymer.

As an alternative, the document DE102008036 161 describes a steering wheel with a motor integrated into a cavity of the rim, but here again problems of quality can occur if the liquid polymer is introduced into the cavity and blocks the electric motor and/or its unbalance.

SUMMARY

A goal of the present invention is to respond to the disadvantages of the documents of the prior art cited above and in particular, first of all, to propose a steering wheel that is easy to produce even if the rim is moulded over with a liquid polymer.

To this end a first aspect of the invention concerns a steering wheel comprising:
  a rim comprising a cavity,
  a device arranged in the rim cavity,
  a hood designed to close the cavity,
  a polymer injected at least partially around the rim and around the hood, characterised in that the steering wheel comprises a sealing means arranged to prevent the polymer from being introduced into the cavity during its injection.

The steering wheel according to the above implementation offers the possibility of placing the device directly into the rim via the cavity without risking seeing the liquid polymer being introduced into the cavity because the steering wheel comprises a hood for closing the cavity and sealing means between the rim and the hood in order to prevent the liquid polymer from being introduced into the cavity.

According to an embodiment the device is a consumer of energy, the steering wheel comprises an energy conductor connected to the motor and arranged to connect to an energy network of the vehicle, and the sealing means are arranged to offer a sealed passage to the cavity for the energy conductor. The present implementation permits, without the addition of a seal or of an orifice, connecting the device to an energy network of the vehicle without comprising the seal. In fact, the energy conductor passes through the sealing means and this passage is naturally tight. It is possible to envision a passage through the sealing means for an electrical cable if the device is electrical, or a passage for a channel of heat transfer fluid, for example.

According to an embodiment the hood comprises a mechanical stop arranged to define a predetermined compression of the sealing means when said hood closes the cavity. The mechanical stop avoids having to exert a compression force calibrated in a range with a minimum force and a maximum force. It is sufficient to exert a minimum force in order to put the mechanical stop of the hood in contact with a reference surface of the rim and the seal is guaranteed.

According to an embodiment the hood comprises means for positioning the device in the cavity. The function of localising the device in the cavity is put on the hood, which allows the manufacture of the rim and of its cavity to be simplified. The hood is easier to modify than the rim because it is possible to select from several embodiments whereas the rim is obtained by moulding by injection.

According to an embodiment the hood comprises means for localisation on the rim. These contacts between the hood and the cavity guarantee the controlled and reproducible positioning of the device in the cavity. This is useful for being able to define the cavity to be as small as possible in order to have the least possible impact on the steering wheel design. Furthermore, this allows a controlled and reproducible positioning of the device in the cavity whatever the manner of fixing the hood on the rim.

According to an embodiment the hood is fixed on the rim by fixing screws and the sealing means are arranged between the fixing screws and the cavity. It is also possible to envision using self-tapping screws and their passage holes in the support piece will be smooth, or using conventional screws and their passage holes in the support piece will then be tapped.

The sealing means is advantageously a seal between the hood and the cavity. It is possible to envision an O-ring seal or quadrilobate seal, a plane seal or a lip seal. These types of seals can be realized from rubber, polymer paper or even from a metal (copper, for example).

Either the hood or the rim advantageously consists of an elastic material with a deformable lip forming the sealing means. According to this embodiment the sealing means are integrated into the hood or into the rim.

The sealing means is advantageously formed by a projection of either the hood or of the rim and is designed to be plastically deformed during the mounting of the hood on the rim. It is possible to envision crushing a projecting part that is sufficiently thin to be plastically deformed and to form a barrier to the polymer between the rim and the hood to prevent it from being introduced into the cavity.

The hood is advantageously designed to be clipped on the rim and either the hood or the rim comprises a clipping lip that forms the sealing means.

According to an embodiment the device is a motor that drives an unbalance. The sealing means according to the invention eliminates the risk of liquid polymer leaking inside the cavity, which could block the motor and/or the unbalance.

According to an embodiment the steering wheel comprises passage holes arranged to cooperate with the fixing screws and the passage holes are through holes. In combination with the implementation in which the sealing means pass between the fixation screws and the cavity it is possible to obtain a reduction of cost with the through passage holes without compromising the quality because even if the liquid polymer is introduced between the passage holes and the threads of the fixing screws the sealing means will prevent the passage of the liquid polymer to the cavity.

According to an embodiment the sealing means are moulded onto the hood. The assembly cost is reduced and there is only one component to be fixed on the steering wheel.

According to an embodiment the sealing means have a hardness comprised between 40 and 80 shore A.

According to an embodiment the polymer is polyurethane.

A second aspect of the invention is an automobile comprising at least one steering wheel in accordance with the first aspect of the invention.

Other characteristics and advantages of the present invention will appear more clearly from a reading of the detailed description of a following embodiment of the invention given as a non-limiting example and illustrated by the attached drawings, in which:

FIG. 1 shows a top view of a frame of a steering wheel in accordance with the invention;

FIG. 2 shows a hood of the steering wheel of FIG. 1.

FIG. 1 shows a frame of a vehicle steering wheel comprising a rim 10 connected to a hub 20 by two branches 30. The rim 10 comprises in its lower part a cavity 11 designed to receive an electrical motor that drives an unbalance in rotation in order to create vibrations.

BRIEF DESCRIPTION OF THE DRAWINGS

Therefore, the steering wheel is put in vibration directly in the rim 10 at the level at which the hands of the user conducting the vehicle in which the steering wheel is mounted are positioned. The efficacy is improved.

DETAILED DESCRIPTION

Figure 1:
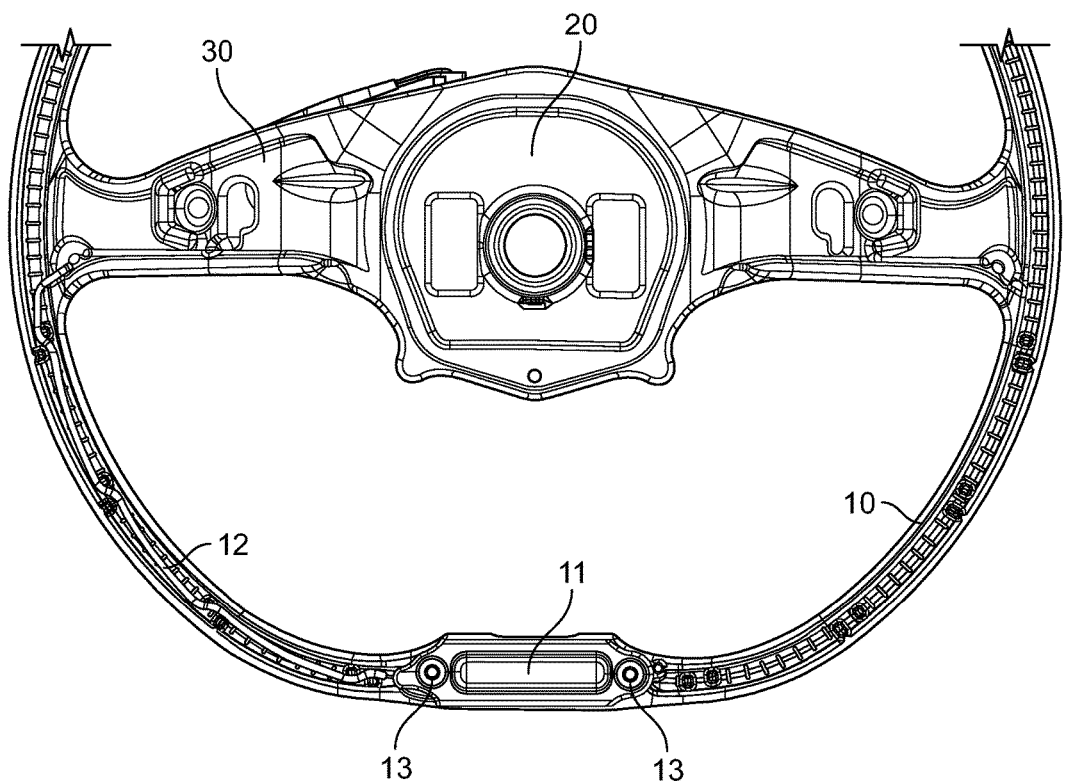

In order to feed the electrical motor an electrical cable 12 runs from the hub 20, passes through one of the branches 30 and joins the cavity 11 via the rim 10 in order to ensure the supply of energy. A hood 40 (FIG. 2) is provided for closing the cavity 11 when the motor is mounted in it. The motor is mounted on the hood, which allows limiting the stresses of realizing the cavity 11 in the rim 10.

After the mounting of the components of the steering wheel the rim 10 is moulded over with a liquid polymer which then hardens by a reaction of polymerization. It is possible to envision, for example, using polyurethane, which is very fluid during its injection.

This fluidity of the polymer during the injection can cause blockages of the motor and/or of the unbalance which is/are mounted in the cavity 11 if polymer is introduced into the cavity 11.

In order to remedy this problem, the invention proposes integrating sealing means between the hood 40 and the rim 10.

Figure 2:
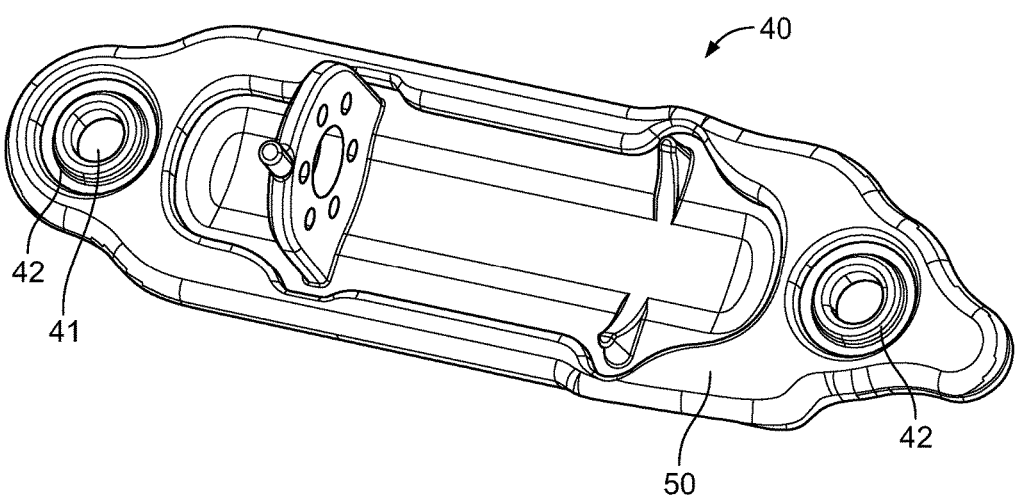

FIG. 2 represents a bottom view of the hood 40 with sealing means 50 moulded on the hood 40. It is possible to envisage moulding on ethylene propylene diene or EPDM in order to obtain the sealing means 50 with a Shore hardness A comprised between 40 and 80.

The hood 40 comprises two passage holes 41 for fixing screws (not shown). Passage holes 13 are provided in the rim 10 in order to permit the fixing of the hood 40.

In order to guarantee a good compression of the sealing means, mechanical stops 42 are integrated into the hood 40 around the passage holes 41. Therefore, during the mounting the tightening of the fixing screws brings the mechanical stops 42 in contact with the rim 10, which defines and limits the compression of the sealing means 50.

If the passage holes 13 are through holes, liquid polymer can be introduced between the threads of the fixing screws and the passage holes 13 and thus rise up along the fixing screws. In order to avoid any propagation of this liquid polymer in the cavity 11, a part of the sealing means 50 is arranged between the passage holes 41 and the cavity 11.

Of course, various modifications and/or improvements obvious to a person skilled in the art can be added to the different embodiments of the invention described in the present description without departing from the scope of the invention defined by the attached claims. Note that as regards sealing means moulded on the hood, it is possible to envision moulding the sealing means locally on the rim of the steering wheel or to implant added sealing means.

The invention claimed is:

1. A vehicle steering wheel comprising:
a rim having a cavity for receiving a device therein, the rim further having first and second rim passage holes;
a hood closing the cavity, the including first and second hood passages holes extending through the hood and aligning with the first and second rim passage holes, the hood further including first and second mechanical stops integrated into the hood for contacting the rim, the hood configured for mounting a motor to be positioned in the cavity thereto; and
sealing means between the rim and the hood,
wherein the hood is sealed with the rim by the sealing means at least partially around the rim and around the hood configured to prevent a liquid polymer from being introduced into the cavity during injection of the liquid polymer, and
wherein the first and second mechanical stops circumferentially surround the first and second hood passage holes and define a compression limit for the sealing means.

2. The vehicle steering wheel according to claim 1, wherein the cavity is adapted to receive a motor therein, and wherein a sealed passage to the cavity is provided.

3. The vehicle steering wheel according to claim 1, wherein the hood is fixed on the rim.

4. The vehicle steering wheel according to claim 3, wherein the first and second rim passage holes and the first and second hood passage holes are for receiving fixing screws.

5. The vehicle steering wheel according to claim 1, wherein the sealing means is moulded onto the hood.

6. The vehicle steering wheel according to claim 5, wherein the sealing means has a hardness between 40 and 80 shore A.

* * * * *